(12) United States Patent
Kugel et al.

(10) Patent No.: US 8,128,300 B2
(45) Date of Patent: Mar. 6, 2012

(54) HAND HELD PHOTOCHROMIC MARKING IMPLEMENT

(75) Inventors: Alexander Kugel, Fargo, ND (US); Jeffrey Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 12/817,110

(22) Filed: Jun. 16, 2010

(65) Prior Publication Data

US 2010/0254747 A1 Oct. 7, 2010

Related U.S. Application Data

(62) Division of application No. 11/313,412, filed on Dec. 20, 2005, now Pat. No. 7,758,268.

(51) Int. Cl.
| | |
|---|---|
| *A45D 80/20* | (2006.01) |
| *B43K 29/00* | (2006.01) |
| *B43K 19/00* | (2006.01) |
| *C09D 13/00* | (2006.01) |
| *C09D 11/00* | (2006.01) |
| *C09K 11/00* | (2006.01) |
| *B29B 17/00* | (2006.01) |
| *B29C 71/00* | (2006.01) |

(52) U.S. Cl. ......... 401/88; 401/49; 401/52; 106/31.1; 106/31.14; 106/31.29; 106/31.32; 264/21; 264/348

(58) Field of Classification Search ............ 401/49, 401/52, 88; 106/31.1, 31.14, 31.29, 31.32; 434/391; 523/164; 264/21, 348

See application file for complete search history.

(56) References Cited

U.S. PATENT DOCUMENTS

| | | | | |
|---|---|---|---|---|
| 1,537,998 | A * | 5/1925 | Mohr | 401/93 |
| 2,818,432 | A * | 12/1957 | Kirby, Jr. | 564/216 |
| 2,966,449 | A * | 12/1960 | Bouchard et al. | 204/500 |
| 3,655,971 | A * | 4/1972 | Haas et al. | 430/19 |
| 3,962,526 | A * | 6/1976 | Panken | 462/56 |
| 3,973,966 | A * | 8/1976 | Flannery et al. | 430/332 |
| 4,042,559 | A * | 8/1977 | Abelson et al. | 428/142 |
| 4,136,699 | A * | 1/1979 | Collins et al. | 604/387 |
| 4,212,786 | A * | 7/1980 | Murakami | 523/164 |
| 5,208,132 | A * | 5/1993 | Kamada et al. | 430/138 |
| 5,593,486 | A * | 1/1997 | Oliver et al. | 524/96 |
| 2004/0070993 | A1* | 4/2004 | Wang | 362/577 |
| 2004/0176634 | A1* | 9/2004 | Titterington et al. | 560/19 |

OTHER PUBLICATIONS

"Photonic/Optical Material" document from Aldrich company (no. date).*

* cited by examiner

*Primary Examiner* — Anthony J Green
*Assistant Examiner* — Pegah Parvini
(74) *Attorney, Agent, or Firm* — Marger Johnson & McCollom, P.C.

(57) ABSTRACT

Disclosed is a hand-held photochromic marking implement including a photochromic colorant and solid phase colorant carrier which can be used in direct-to-media marking and a method of forming same.

17 Claims, No Drawings

HAND HELD PHOTOCHROMIC MARKING IMPLEMENT

CROSS-REFERENCE TO RELATED APPLICATIONS

This is a Division of U.S. patent application Ser. No. 11/313,412, filed Dec. 20, 2005 now U.S. Pat. No. 7,758,268, entitled HAND HELD PHOTOCHROMIC MARKING IMPLEMENT, the disclosure of which is herein incorporated by reference in its entirety.

BACKGROUND

Disclosed herein are hand held photochromic marking implements and methods for making the same. More specifically, disclosed herein are hand-held marking implements that include a handle portion for gripping the marking implement, and a marking portion comprising a solid carrier material and a photochromic colorant. In one embodiment the photochromic colorant is substantially colorless when inactivated and a predetermined color when activated. In another embodiment a method is provided forming a hand-held marking implement. This method can comprise forming flowable solid carrier material including a photochromic colorant cooling and shaping the flowable carrier material. In this way a solid hand-held marking implement as described above can be formed.

In general, hand-held marking implements can have many structural forms and utilize many direct marking modes. The typical structure of a marking implement is a variation on an elongated, stick-like form, which facilitates controlled marking by the human hand. The common direct marking modes include deposition of either colored liquid substances, such as an ink, or colored solid phase substances, such as a graphite, chalk, or wax, onto a recording media. Marking implements comprising a colorant incorporated into a solid carrier of wax or chalk are commonly referred to as crayons. Crayons are in the solid phase at ambient temperature, but are soft enough to deposit colored carrier material directly onto a selected media.

Photochromism in general is a reversible change of a single chemical species, a photochromogen, between two states having distinguishably different absorption spectra, wherein the change is induced in at least one state by the action of electromagnetic radiation. The inducing radiation, as well as the changes in the absorption spectra, are usually in the ultraviolet, visible, or infrared regions. In some instances, the change in states is thermally induced. The photochromogen can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as eyeglasses, toys, clothing, and inks. Photochromic phase change ink compositions are described in U.S. Pat. Nos. 5,593,486 and 5,759,729, which are incorporated herein in their entirety by reference.

A need remains for improved hand-held direct marking implements which, unlike conventional marking implements, have photochromic characteristics. These characteristics can provide, for example, the ability to create marks that either become visible or change color state upon activation. A need further remains for marking implements having compositions and structural shapes designed to be hand-held and capable of directly marking various recording media with a mark having a modifiable visual appearance. There is an artistic need for a hand-held, direct-to-media marking implement that can create a mark that can be reversibly modulated between a first color and a second color. There is also a need for a simple, hand-held direct-to-media marking implement which enables the quick placement of a marking on a medium which is not readily detectable until it is activated by a radiation source.

SUMMARY

Disclosed herein are hand held photochromic marking implements and methods for making the same. As described above a hand-held marking implement can be provided that includes a handle portion for gripping the marking implement, and a marking portion comprising a solid carrier material and a photochromic colorant. In an embodiment described herein the photochromic colorant is substantially colorless when inactivated and a predetermined color when activated. A further embodiment can be provided comprising a method for forming a hand-held marking implement. This method can be as described above.

DETAILED DESCRIPTION

The marking implement as disclosed herein has a handle portion and at least one marking portion. The marking portion may be a point, an edge, or a surface that can be used to write or mark on a recording medium. In one embodiment, the marking implement has a generally elongated, stick-like handle portion that can be comfortably grasped by the hand of a user and the marking portion has a tapered shape adapted for marking. At least the marking portion of this embodiment comprises a solid phase carrier material and a photochromic colorant. Depending on the specific embodiment, the handle portion may also comprise the solid carrier material and photochromic colorant. In a particular embodiment, the handle portion of the marking implement is comprised primarily of the carrier material and thus the physical properties of the both the handle portion and the marking portion depend directly on the physical properties of the carrier material. In another embodiment, the handle portion of the marking implement comprises the carrier material embedded within an outer cladding, wherein the physical properties of the marking implement handle portion depends only indirectly on the physical properties of the carrier material. In still other embodiments, the handle portion of the marking implement does not comprise any of the carrier material and only the marking portion contains the carrier material and photochromic colorant.

In the exemplary compositions described below, the solid phase carrier comprises a low polarity wax to control the melting point, softness, and basic physical properties of the carrier material. These mechanical factors influence the durability and marking or writing performance of the solid phase carrier, such as resistance to breakage and bending of the marking portion of the implement, pressure needed to mark a recording medium, smoothness of marking, adhesion of marking, and minimization of crumbling and other undesired phenomena when marking. It is commonly known in the art that as the melting point of the low polarity wax is reduced, the wax becomes mechanically softer. Thus, the hardness of the carrier material can be tailored by first choosing a wax of a particular melting or softening point and then choosing the percent composition of the particular wax in the carrier material. In embodiments of the present invention, the low polarity wax can be paraffins, microcrystalline waxes, polyethylene waxes, ester waxes, amide waxes, such as a tetra-amide wax, fatty acids, fatty alcohols, such as the UNILIN® products available from Baker Petrolite, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. In particular embodiments of the present invention, the low polarity wax can be Polyethylene Wax 5300 or Polyethylene Wax 8400, both made by Mitsui Chemical. In still other particular embodiments of the present invention, a polyalkylene wax, such as a polyethylene wax, a polypropylene wax, or mixtures thereof Examples of suitable polyalkylene waxes include POLYWAX® 400 and POLYWAX® 500 (commercially available from Baker Petrolite), Vybar 103 and 253, commercially available from Baker Petrolite, POLYWAX® 655 and higher molecular weight polywax materials are also suitable. In other particular embodiments of the present invention, the low polarity wax is a fatty amide-containing material such as a tetra-amide wax compound. The preferred tetra-amide wax compounds for producing the phase change ink carrier composition are Dimer acid-based tetra-amides which preferably include the reaction product of a fatty acid, a diamine (ethylene diamine) and a Dimer acid. Fatty acids having from 10 to 22 carbon atoms can be employed in the formation of the Dimer acid-based tetra-amide. Dimer acid-based tetra-amides can be those produced by Union Camp and comprise the reaction product of ethylene diamine, Dimer acid, and the following fatty acids: decanoic acid (Union Camp X3202-23), myristic acid (Union Camp X3202-56), stearic acid (Union Camp X3138-43, X3164-23, X3202-44, X3202-46, X3222-65, X3261-37, X3261-53, and X3290-72), docasanic acid (Union Camp X3202-36). For purposes of this invention, the most preferred Dimer acid-based tetraamide is the reaction product of Dimer acid, ethylene diamine and stearic acid in a stoichiometric ratio of 1:2:2. Stearic acid is the preferred fatty acid reactant because its adduct with Dimer acid and ethylene diamine has the lowest viscosity of the Dimer acid-based tetra-amides. Its ingredients also are the most readily available and therefore lowest in cost. In one such embodiment, the Dimer acid-based tetra-amide material is Unirez resin, made by Union Camp Corporation. Dimer acid-based tetra-amides can be prepared as disclosed in, for example, U.S. Pat. No. 6,174,937, the disclosure of which is totally incorporated herein by reference.

Depending on the desired mechanical properties and the low polarity wax chosen for a particular embodiment. The low polarity wax(es) can be present in the carrier material in one embodiment of at least about 20 percent by weight, in another embodiment of at least about 25 percent by weight, and in yet another embodiment of at least about 30 percent by weight, and in one embodiment equal to or less than about 50 percent by weight, in another embodiment equal to or less than about 55 percent by weight of the ink carrier, and in yet another embodiment equal to or less than about 60 percent by weight of the ink carrier, although the amount can be outside of these ranges.

In certain embodiments, the solid phase carrier material includes a mechanical strengthening agent, thereby lowering the percent composition of low polarity wax in the carrier material. In particular embodiments, a tackifier resin is the mechanical strengthening. In certain embodiments, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, can be utilized.

In certain embodiments, the mechanical strengthening agent is a polyurethane resin. Suitable materials also can include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are incorporated herein in their entirety by reference.

In one embodiment, the tackifier can be present in the carrier material in one embodiment of at least about 10 percent by weight, in another embodiment of at least about 15 percent by weight, and in yet another embodiment of at least about 20 percent by weight, and in one embodiment equal to or less than about 40 percent by weight, in another embodiment equal to or less than about 45 percent by weight of the ink carrier, and in yet another embodiment equal to or less than about 50 percent by weight of the ink carrier, although the amount can be outside of these ranges.

In certain embodiments of the present invention, the carrier material includes a dye solubility agent to enhance the solubility of the colorants in the carrier material. In further embodiments suitable dye solubility agents can comprise fatty acids include fatty amides, such as mono-amides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

In one embodiment, the fatty acid solubility agent can be present in the carrier material in one embodiment of at least about 30 percent by weight, in another embodiment of at least about 40 percent by weight, and in yet another embodiment of at least about 50 percent by weight, and in one embodiment equal to or less than about 70 percent by weight, in another embodiment equal to or less than about 80 percent by weight of the ink carrier, and in yet another embodiment equal to or less than about 90 percent by weight of the ink carrier, although the amount can be outside of these ranges.

In some embodiments of the present invention, the carrier material includes a visible, non-photochromic colorant. Inclusion of a visible colorant in the carrier material composition permits the markings to be viewed as they are made. The non-photochromic colorant can be any commonly known dye or pigment that has an appropriate solubility in the carrier material and the desired color. Selection of the color can be made to achieve a desired color combination with a photochromic colorant upon activation of the photochromogen. For example, if a yellow dye is used, markings will have a visible yellow color changing into a blackish color by additive coloration upon activation of the photochromic colorant. Any desired or effective non-photochromic colorant can be employed, including dyes, pigments, mixtures thereof, and the like, provided that the non-photochromic colorant can be dissolved or dispersed in the solid phase carrier material. The solid carrier compositions can be used in combination with conventional colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Use of a non-photochromic dye is a particularly elegant embodiment of the present invention because pigments give color through light scattering and light refraction, which risks interfering with activation of the photochromic colorant (which develops through light absorbance). However, the use of a non-photochromic pigment is also within the scope of the present invention. Examples of suitable non-photochromic pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as Regal 330® (Cabot), Carbon Black 5250, Carbon Black 5750 (Columbia Chemical), and the like.

Also suitable, are the non-photochromic colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, Copending Application U.S. Ser. No. 10/260,146, filed Sep. 27, 2002, entitled "Colorant Compounds," and Copending Application U.S. Ser. No. 10/260,379, filed Sep. 27, 2002, entitled "Methods for Making Colorant Compounds," the disclosures of each of which are totally incorporated herein by reference.

In a specific embodiment, the non-photochromic colorant is an isocyanate-derived colored resin as disclosed in, for example, U.S. Pat. No. 5,780,528 and U.S. Pat. No. 5,919,839, the disclosures of each of which are totally incorporated herein by reference. In such an embodiment, the mechanical strengthening and visible colorant features are combined. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference.

The non-photochromic colorant is present in the solid phase carrier in any desired or effective amount to obtain the desired color or hue. In one embodiment of the present invention, the quantity of colorant is about 0.1 percent by weight of the carrier material. In a further embodiment, the colorant is about 0.5 percent by weight of the carrier material, and in another embodiment about 1 percent by weight of the ink. In yet another embodiment, the amount colorant is no more than about 5 percent by weight of the carrier material, and in still another embodiment the colorant forms no more than about 10 percent by weight the of the carrier material.

Embodiments of the present invention incorporate a variety of photochromic colorants with a variety of carrier materials. As used herein, "photochromic" is intended to describe changes in color or changes from colorless to colorful upon activation. "Photochromic" is not intended to include a colorant which has a first color when exposed to a first segment of the visible light spectrum and a second color appearance upon exposure to a second segment of the visible light spectrum. Activation is achieved in one embodiment by exposure to electromagnetic radiation. In another embodiment photochromic colorant is activated by electromagnetic radiation having an ultraviolet wavelength. The can be accomplished in the wavelength or energy range commonly consider within the ultraviolet spectrum. Examples of such ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are incorporated herein in their entirety by reference.

Examples of suitable photochromic colorants include compounds that undergo heterolytic cleavage, such as spiropyrans, benzospiropyrans, related compounds, and the like; compounds that undergo homolytic cleavage, such as bisimidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; including those disclosed in U.S. Pat. No. 5,759,729, the disclosure of which is incorporated herein in its entirety by reference. As an illustrative example, a photochromic spirobenzopyran can be formed by combining an indoline derivative with 5-nitrosalicylaldehyde.

Various colors can be obtained through the use of different photochromic colorants. For example, 1'3'-Dihydro-1',3',3'-trimethyl-6-nitrospiro-[2H-1-benzopyran-2,2'-(2H)-indole], available from Aldrich Chemical Co., Milwaukee, Wis., having the structure:

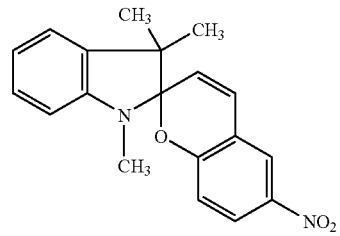

develops to a purple-black upon exposure to ultraviolet light. Another exemplary photochromic material is 1'-Dodecyl-6-nitro BIPS, where BIPS is Spiro (2H-1-benzopyran-2,2'-indoline, available from Chroma Chemicals, Dayton, Ohio. Yet another exemplary photochromic material is 1,3-dihydro-1,3,3-trimethylspiro[2H-indole-2,3'-[3H]naphtha[2,1-b]-[1,4]oxazine], available from Aldrich Chemical Company, Milwaukee, Wis.

The photochromic colorant is present in the solid phase carrier in any desired or effective amount to obtain the desired color or hue. In one embodiment of the present invention, the quantity of colorant is about 0.1 percent by weight of the carrier material. In a further embodiment, the colorant is about 0.5 percent by weight of the carrier material, and in another embodiment about 1 percent by weight of the ink. In yet another embodiment, the amount colorant is no more than about 5 percent by weight of the carrier material, and in still another embodiment the colorant forms no more than about 10 percent by weight the of the carrier material.

Specific hand held marking implement embodiments will now be described in detail. These examples are intended to be illustrative, and the claims are not limited to the materials, conditions, or process parameters set forth in these particular embodiments.

Example 1

A photochromic marking implement was prepared in a stainless steel beaker by adding: (1) about 317 grams (52 wt %) of stearyl stearamide (KEMAMIDE 5-180, obtained from Witco Corp.; (2) about 155.3 grams (26 wt %) of a glycerol ester of hydrogenated (rosin) acid tackifier resin (KE-100, obtained from Arakawa Chemical Industries, Ltd, Osaka, Japan); and (3) about 126.6 grams (21 wt %) of Unirez 2970 (a tetra-amide resin obtained from the reaction of one equivalent of dimer acid with two equivalents of ethylene diamine and two equivalents of stearic acid). These materials were melted together in a heating mantle at a temperature of about 110° C. After stirring for about 30 minutes at about 500 rpm, to this mixture was then added (4) 0.8 grams (1 wt %) of photochromic colorant (formed by the reaction of one mole of Fischer's Base and one mole of 5-nitrosalicylaldehyde). The mixture was stirred for about 10 additional minutes, poured into molds and then cooled to room temperature to solidify. The solid was then removed from the molds and labeled with paper sleeves indicating the color that appears after exposure to electromagnetic radiation.

Example 2

A photochromic marking implement was prepared in a four-ounce beaker by adding: (1) about 20 grams (25 wt %) of stearyl stearamide (KEMAMIDE S-180, obtained from Witco Corp.; (2) about 20 grams (25 wt %) of a urethane resin having the composition of Example 1, U.S. Pat. No. 6,620,228, the disclosure of which is totally incorporated herein by reference; and (3) 40 grams (50 wt %) of Polyethylene Wax 8400, obtained from Mitsui Chemical. These materials were melted together in a 140° C. silicone oil bath under magnetic stirring conditions. After the mixture became molten, then was added (4) about 0.8 grams (1 wt %) of an ultraviolet-responsive chromogenic colorant (1'3'-Dihydro-1',3',3'-trimethyl-6-nitrospiro[2H-1-benzopyran-2,2'-(2H)-indole] (Aldrich Chemical #27361-9)). This mixture was then stirred for about 30 additional minutes, poured into molds and then cooled to room temperature to solidify. The solid was then removed from the molds and labeled with paper sleeves indicating the color that appears after exposure to electromagnetic radiation.

Example 3

A marking implement was prepared as described in Example 2 except that about 40 grams of Polyethylene wax 5300 (Mitsui Chemical) was utilized in place of the 40 grams of Polyethylene 8400.

Example 4

A marking implement was prepared as described in Example 2 except that about 40 grams of POLYWAX® 655 (available from Baker Petrolite, Tulsa, Okla.) was utilized in place of the 40 grams of Polyethylene Wax 8400.

Example 5

A marking implement was prepared as described in Example 2 except that about 40 grams of POLYWAX® 500 (available from Baker Petrolite, Tulsa, Okla.) was utilized in place of the 40 grams of Polyethylene Wax 8400.

The marking implements of the present invention were used to directly mark on paper recording media by hand. The marks made were not visible to the human eye until placed in natural light, a portion of which is comprised of ultraviolet electromagnetic radiation. The ultraviolet light activated the photochromic colorant in the marking and the mark became visible. Upon subsequent removal of the sample from the ultraviolet radiation source, the mark returned to the deactivated state, wherein the mark was again not visible to the human eye. The marking can "disappear" and "reappear" a multitude of time upon addition or removal of radiation source.

While the embodiments disclosed herein are particularly graceful modes of the present invention, it should be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of forming a solid hand held direct marking crayon implement comprising:
    forming a flowable solid phase carrier material comprising
        (a) at least about 20% by weight, based on the weight of the carrier material, of at least one low polarity wax, (b) a dye solubility agent and (c) a photochromic colorant comprising at least one of 1'3'-Dihydro-1',3',3'-trimethyl-6-nitrospiro[2H-1-benzopyran-2,2'-(2H)-indole], 1,3-dihydro-1,3,3-trimethylspiro[2H-indole-2,3'-[3H] naphtha[2,1-b][1,4]oxazine, and mixtures thereof;
    cooling and shaping said solid phase flowable carrier material; and
    forming a solid hand-held direct marking implement which is soft enough to write a colored carrier material directly onto a selected media, at ambient temperature, said marking implement comprising a handle portion for gripping said marking implement and a marking portion comprising said solid phase carrier material.

2. The method of claim 1, further comprising shaping said solid hand-held marking implement by cooling said flowable carrier material in a mold.

3. The method of claim 1, further comprising wrapping said handle portion with an outer cladding.

4. The method of claim 1, wherein the photochromic colorant is substantially colorless when inactivated and has a color when activated.

5. The method of claim 1, wherein said photochromic colorant is activated by electromagnetic radiation having an ultraviolet wavelength.

6. The method of claim 1, wherein said photochromic colorant is activated by electromagnetic radiation.

7. The method of claim 1, wherein said photochromic colorant is activated by an ultraviolet dye.

8. The method of claim 1, wherein the photochromic colorant comprises a hydrazine compound.

9. The method of claim 1, wherein the carrier material further comprises a soluble visible non-photochromic colorant which permits the markings to be viewed as they are made.

10. The method of claim 1, wherein the carrier material includes a mechanical strengthening agent.

11. The method of claim 10, wherein the mechanical strengthening agent comprises a resin tackifier.

12. The method of claim 1, wherein the low polarity wax comprises a polyalkylene wax.

13. The method of claim 12, wherein the polyalkylene wax comprises a polyethylene wax.

14. The method of claim 1, wherein the low polarity wax comprises a tetra-amide wax.

15. The method of claim 1, wherein the dye solubility agent comprises a fatty amide.

16. The method of claim 1, wherein the dye solubility agent is a fatty acid.

17. The method of claim 1, wherein said handle portion is embedded within an outer cladding.

* * * * *